United States Patent [19]
de Vries

[11] 4,436,282

[45] Mar. 13, 1984

[54] GATE VALVE WITH REINFORCING RIBS

[75] Inventor: Jan de Vries, Amsterdam, Netherlands

[73] Assignee: Thomassen Amsterdam B.V., Amsterdam, Netherlands

[21] Appl. No.: 313,644

[22] Filed: Oct. 22, 1981

[51] Int. Cl.³ ............................................ F16K 27/04
[52] U.S. Cl. ..................................... 251/329; 251/366
[58] Field of Search ................................ 251/329, 366

[56] References Cited

U.S. PATENT DOCUMENTS

| | | | |
|---|---|---|---|
| 2,904,306 | 9/1959 | Bryant | 251/329 X |
| 3,260,503 | 7/1966 | Grove | 251/329 |
| 3,638,908 | 2/1972 | Grove | 251/329 |

FOREIGN PATENT DOCUMENTS 508384   1/1952   Belgium ............................. 251/329

Primary Examiner—Arnold Rosenthal
Attorney, Agent, or Firm—Christie, Parker & Hale

[57] ABSTRACT

A gate valve having a body with flat parallel end walls with aligned openings and reinforcing ribs extending across the exterior faces of said end walls. The reinforcing ribs on opposite sides of the end walls are interconnected by side strips which are not connected to the side walls of the valve body and are welded to the opposite ribs by welding connections between the opposite edges of opposite ribs and those ends of the side strips which are bent around the outer corners of the ribs. Preferably the side strips are formed by the legs, interconnected by welding, of U-shaped strips having a width which is larger than the thickness of the ribs.

4 Claims, 3 Drawing Figures

GATE VALVE WITH REINFORCING RIBS

BACKGROUND OF THE INVENTION

For large pipe lines large gates valves are known having a body manufactured from steel plates which are welded together to obtain two parallel flat end walls and two side walls such that in a plane perpendicular to said end walls, a rectangular cross section is obtained. Said end walls are provided with aligned openings to form flow passages, and hubs and pipe sections can be placed in line with said openings for making the connection with associated piping. The valve body of said gate valves is formed by a plate slidable between annular seals which are concentric with the flow passages, said plate having an opening which can be brought in line with the flow passages or can be closed by another portion of said plate. This structure of the valves requires a large valve body the walls of which being subjected to the loads resulting from the pressure in the piping, in particular, from the pressure shocks which can occur upon closing the valve and the high pressure to be held in the closed condition. This requires very rigid end walls and to this end it is well known to provide the end walls with reinforcing ribs extending across the exterior faces of said end walls and in engagement therewith which ribs are placed in parallel planes, the ribs on both sides of the body present in a common plane being interconnected by side strips, the outer ends of which are welded to the ribs and which themselves are welded to the side walls.

An example of such gate valve is shown in U.S. Pat. No. 3,260,503. Another example is shown in U.S. Pat. No. 3,638,908.

Gate valves of this type are large heavy bodies which have to fulfill safety prescriptions in particular with respect to the weldings.

The manufacturing of the known gate valve constructions is difficult and time consuming and a number of welding seams of said known constructions do not allow proper and complete examination. In a welding construction of this size it always is difficult and requires skill to keep the tensions within the material resulting from the welding process in acceptable limits.

SUMMARY OF THE INVENTION

It is an object of the present invention to provide an improved gate valve construction in which the connection of the reinforcing ribs can be more easily performed.

It is a further object of the invention to interconnect the reinforcing ribs by means of side strips such that the resistance against bending of the reinforcing ribs is increased and the bending forces within the side strips is reduced. This can reduce the bending of the end walls or the reinforcing ribs may be of a lighter type.

A still further object of the invention is to have greater freedom in the choice of material for the reinforcing ribs and their interconnecting strips.

The objects and features of the invention will appear from the following description in which the preferred embodiment has been explained by reference to the drawing.

DESCRIPTION OF THE PREFERRED EMBODIMENT

Figure 1:
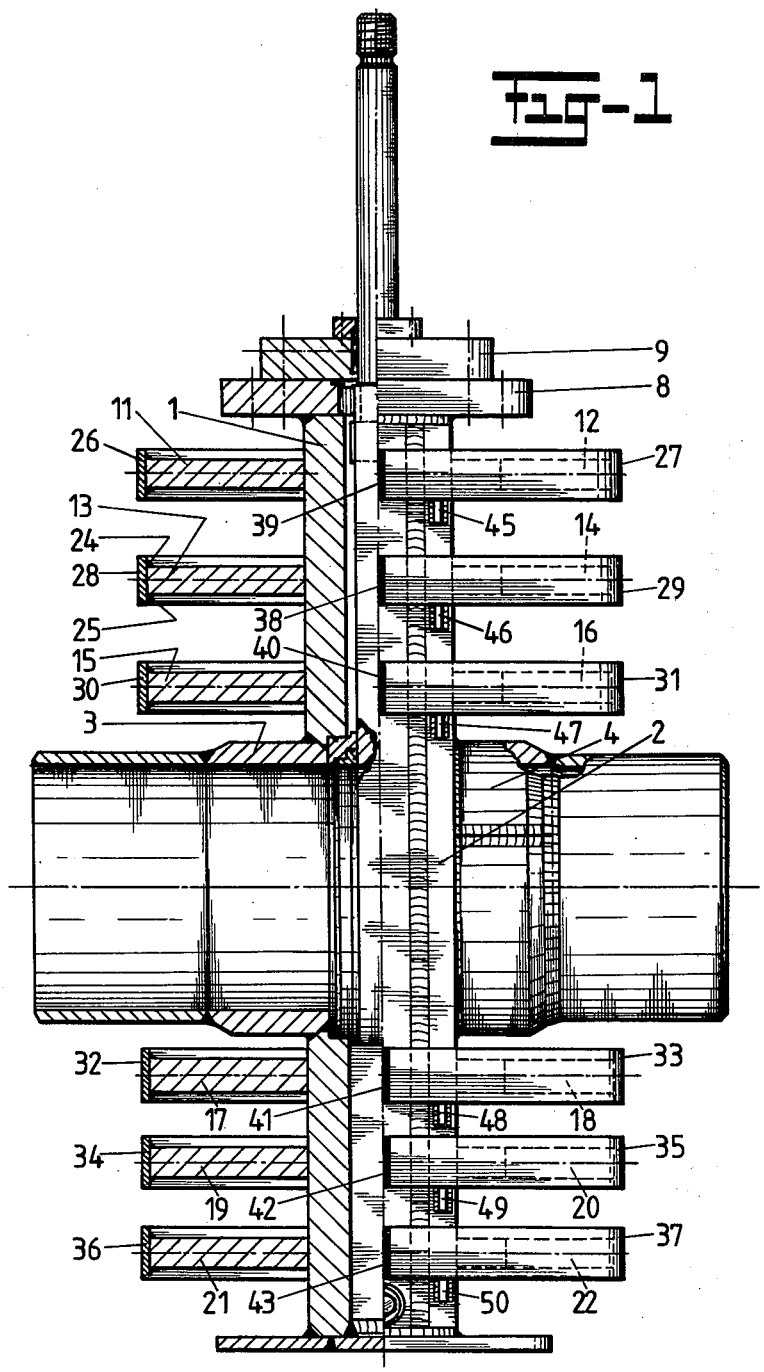
FIG. 1 is a side view partially in section of a gate valve according to the invention.
Figure 2:
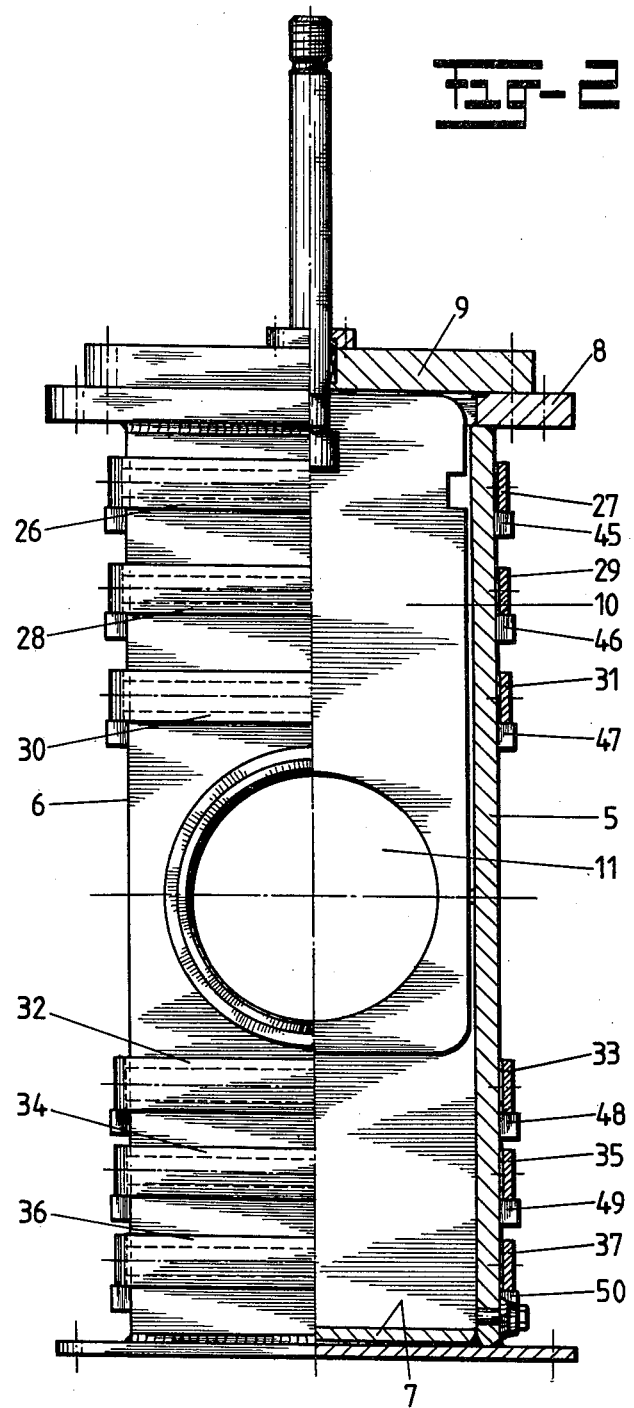
FIG. 2 is an end view partially section of the gate valve of FIG. 1.
Figure 3:
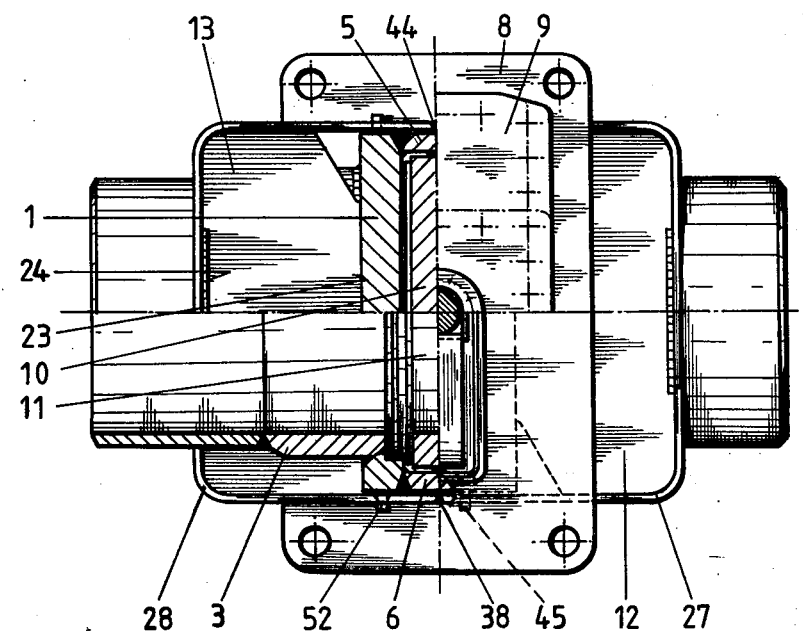
FIG. 3 is a top view partially section in the upper half according to the line B—B and in the lower half according to the line A—A.

The gate valve shown in FIGS. 1, 2 and 3 comprises a body made from end plates 1 and 2 having cylindrical hubs 3 and 4 as well as side walls 5 and 6. The end walls 1 and 2 and the side walls 5 and 6 form a body having a rectangular cross section in the plane of FIG. 3 the inner space of which being closed at the bottom by a plate 7 and at the top by the plates 8 and 9.

The valve body is formed by the plate 10 having a circular opening 10′ said valve body 10 in FIG. 2 being shown in the position in which the valve is open.

Across the outer faces of the end walls 1 and 2 reinforcing ribs 11 and 12 are provided placed in a common plane perpendicular to said end walls. Similar pairs of ribs are indicated with 13,14; 15,16; 17,18; 19,20 and 21, 22.

Each reinforcing rib 11 to 22 inclusive has an inner edge like the edge 23 in FIG. 3 which abutts against the exterior face of the end wall 1 or 2 respectively.

In the preferred embodiments, each rib by means of welding seams like the seams 24,25 has been connected to a respective one of U-shaped straps 26 to 37 inclusive. Said U-shaped straps have legs lying against the side edges of the reinforcing ribs 11 to 22 inclusive and the ends of said legs of each pair of U-shaped straps are directed towards each other and interconnected by means of welding seams 38 to 43 inclusive at one side of the body and similar welding seams like the seam 44 on the other side of the body. Said welding seams seen in the vertical direction of the body are all in line with each other on each side of the valve body and remain completely free from the side walls 5,6.

As follows from the drawings the straps 26 to 37 inclusive have a width in the vertical plane which is larger than the thickness of the ribs 11 to 22 inclusive. Accordingly said straps increase the bending resistance of the reinforcing ribs in the plane of said ribs.

The side face of the body has been provided with a series of protrusions like the protrusions 45 to 50 inclusive in FIG. 1 right side with similar protrusions on the opposite side and such that each side face has two rows as shown in FIG. 3 with the reference 45 and 52. The U-shaped straps 26 to 37 inclusive are resting upon said protrusions and have no connection with them. Said protrusions only serve to define the position of the reinforcing ribs and to assist during assembly.

During the assembly operation reinforcing ribs and U-shaped straps are preassembled in the work shop. They are then placed upon the supporting protrusions of the body and preliminary interconnected by welding spots. If this is done with all reinforcing ribs the inline welding seams are made one following the other and this can be done according to well known work shop techniques in one line by interposing temporary strips which later on are removed.

The ribs in the preferred embodiment will not have a welding connection with the outer faces of the end walls 1 and 2. However, if this is desirable this can be performed as well.

The side strips also can be formed by U-shaped straps which have their basic portion extending parallel to the side walls 5 and 6 respectively and the ends of the legs located at the center of the welding seams 24, 25. In that case welding seams 38 to 43 inclusive do not exist.

For the ease of manufacturing and to avoid undesirable tensions it is an essential feature of the invention that there is no connection between the side strips and the side walls like a welding connection.

A further important feature is that the reinforcing ribs and in particular the interconnecting U-shaped straps side strips respectively can be made from a material of higher quality such as higher tensile strength than the material from which the body has to be made to facillitate welding of the body parts together. According to the invention there is no welding connection anymore between the reinforcing ribs and the body nor between the rib connecting strips or straps and the body.

Inspection of the welding seams by means of well known X-ray or ultrasonic methods now can be performed without any difficulty.

I claim:

1. A gate valve comprising a body formed of flat end walls and flat side walls interconnected by welding to form a substantially rectangular cross section in a plane perpendicular to said end walls, said end walls having aligned openings forming flow passages, a plurality of metal reinforcing ribs extending across the exterior faces of said end walls and in engagement with said end walls on opposite sides of the body, said ribs being disposed in parallel planes parallel to the axis of the flow passage and perpendicular to the longitudinal axis of the body, each rib on one side of the body being in the same plane as a rib on the other side of said body, each rib having an inner portion of the periphery in contact with an end wall and an outer portion of the periphery spaced away from the end walls and extending parallel thereto, the improvement comprising a strap extending around each pair of opposite ribs, the straps extending parallel to the side walls of the body, the straps being securely attached to the ribs only at said outer portions of the periphery.

2. A gate valve as claimed in claim 1, wherein each strap is formed by a pair of U-shaped sections having their ends joined together to form a closed loop.

3. A gate valve as claimed in claim 1 wherein the side walls of the body are provided with protrusions the upper edges of which define the position of the straps.

4. A gate valve as claimed in claim 1 wherein at least that portion of the strap attached to the ribs extends in a plane perpendicular to the plane of the respective ribs a distance that is larger than the thickness of the corresponding rib.

* * * * *